United States Patent
Sato et al.

(10) Patent No.: US 12,305,825 B2
(45) Date of Patent: May 20, 2025

(54) MOBILE-OBJECT-MOUNTED DISPLAY DEVICE

(71) Applicant: FALTEC Co., Ltd., Kawasaki (JP)

(72) Inventors: Ayumi Sato, Kawasaki (JP); Ryuji Shukuri, Kawasaki (JP); Ryo Tanaka, Kawasaki (JP); Yoichi Takano, Kawasaki (JP); Michinari Chiba, Kawasaki (JP); Kazuki Yamaguchi, Kawasaki (JP)

(73) Assignee: FALTEC Co., Ltd., Kawasaki (JP)

( * ) Notice: Subject to any disclaimer, the term of this patent is extended or adjusted under 35 U.S.C. 154(b) by 0 days.

(21) Appl. No.: 18/021,929

(22) PCT Filed: Aug. 20, 2021

(86) PCT No.: PCT/JP2021/030661
§ 371 (c)(1),
(2) Date: Feb. 17, 2023

(87) PCT Pub. No.: WO2022/039270
PCT Pub. Date: Feb. 24, 2022

(65) Prior Publication Data
US 2023/0304642 A1  Sep. 28, 2023

(30) Foreign Application Priority Data
Aug. 21, 2020 (JP) ................. 2020-140030

(51) Int. Cl.
*F21S 43/15* (2018.01)
*B60Q 1/26* (2006.01)
(Continued)

(52) U.S. Cl.
CPC ............ *F21S 43/15* (2018.01); *B60Q 1/2696* (2013.01); *F21S 43/145* (2018.01); *F21S 43/51* (2018.01); *F21Y 2115/15* (2016.08)

(58) Field of Classification Search
CPC ....... B60Q 1/2696; B60Q 1/5035; F21S 4/22; F21S 4/24; F21S 43/14; F21S 43/145;
(Continued)

(56) References Cited

U.S. PATENT DOCUMENTS 7,168,834 B2 * 1/2007 Takeda .................. F21S 43/14
257/E33.059
2004/0226204 A1  11/2004 Green
(Continued)

FOREIGN PATENT DOCUMENTS

DE  102020112312 B3 * 10/2021 ........... B60Q 1/0023
JP  2013-33938 A  2/2013
(Continued)

OTHER PUBLICATIONS

International Search Report for PCT/JP2021/030661 dated Oct. 5, 2021.
European Search Report for EP 21858413.4, dated Sep. 16, 2024.

*Primary Examiner* — Zheng Song
(74) *Attorney, Agent, or Firm* — Moser Taboada (57) ABSTRACT

According to the present invention, there is provided a mobile-object-mounted display device (1, 1A) that is mounted on a mobile object (20) and performs display toward an outside of the mobile object (20), including one or a plurality of light emitting elements (3d) and a light emitting element support body (3e) that supports the one or plurality of light emitting elements (3d) along a surface having a three-dimensional shape.

11 Claims, 6 Drawing Sheets

(51) Int. Cl.
*F21S 43/145* (2018.01)
*F21S 43/50* (2018.01)
*F21Y 115/15* (2016.01)

(58) Field of Classification Search
CPC .. F21S 43/15; F21S 43/19; F21S 43/50; F21S 43/51; G09F 13/044; G09F 13/0481; G09F 13/08; G09F 13/048
See application file for complete search history.

(56) References Cited

U.S. PATENT DOCUMENTS

| | | | | |
|---|---|---|---|---|
| 2005/0094409 | A1* | 5/2005 | Elwell | B60Q 1/2661 |
| | | | | 362/496 |
| 2006/0114686 | A1* | 6/2006 | Liu | B60R 13/04 |
| | | | | 362/509 |
| 2009/0175047 | A1* | 7/2009 | Tsai | F21S 43/14 |
| | | | | 362/351 |
| 2013/0329445 | A1* | 12/2013 | Oh | F21S 43/19 |
| | | | | 362/543 |
| 2014/0140082 | A1 | 5/2014 | Kuboyama et al. | |
| 2015/0131289 | A1* | 5/2015 | Speer | F21K 9/65 |
| | | | | 29/829 |
| 2015/0138807 | A1* | 5/2015 | Salter | F21S 41/16 |
| | | | | 362/543 |
| 2017/0133348 | A1* | 5/2017 | Shido | H10K 59/90 |
| 2019/0049086 | A1 | 2/2019 | Matsubara et al. | |
| 2019/0213931 | A1 | 7/2019 | Brubaker | |
| 2019/0353322 | A1 | 11/2019 | Harada et al. | |
| 2020/0041094 | A1* | 2/2020 | Godbillon | F21S 41/321 |
| 2020/0063941 | A1* | 2/2020 | Yamamoto | F21S 43/14 |
| 2021/0031678 | A1* | 2/2021 | Glickman | F21V 23/003 |
| 2021/0148535 | A1* | 5/2021 | Kim | B60Q 1/0035 |
| 2021/0367116 | A1* | 11/2021 | Eom | H01L 33/60 |
| 2023/0250941 | A1* | 8/2023 | Arai | G09F 13/044 |
| | | | | 362/546 |

FOREIGN PATENT DOCUMENTS

| | | | |
|---|---|---|---|
| JP | 2019-33044 A | 2/2019 | |
| JP | B-6680136 B2 | 4/2020 | |
| WO | WO 2005-025275 A1 | 3/2005 | |
| WO | WO 2018-139202 A1 | 8/2018 | |
| WO | WO-2019238208 A1 * | 12/2019 | ........ B60Q 1/0035 |
| WO | WO 2020-002866 A2 | 1/2020 | |

\* cited by examiner

MOBILE-OBJECT-MOUNTED DISPLAY DEVICE

TECHNICAL FIELD

The present invention relates to a mobile-object-mounted display device. Priority is claimed on Japanese Patent Application No. 2020-140030, filed Aug. 21, 2020, the content of which is incorporated herein by reference.

BACKGROUND ART

In recent years, it has been proposed to install a display device that displays information to pedestrians and other drivers outside a vehicle on the vehicle or the like, assuming the spread or the like of autonomous vehicles in the future. For example, Patent Document 1 proposes a driving support system provided with an own vehicle external display device.

CITATION LIST

Patent Document

[Patent Document 1]
Japanese Patent No. 6680136

SUMMARY OF INVENTION

Technical Problem

However, general displays display information on a flat display surface. On the other hand, an outer surface of a vehicle is generally made into a three-dimensional shape in order to improve an external impression of the vehicle or the like. When a display device such as a planar display is installed on the outer surface of a vehicle made into a three-dimensional shape, especially when information is displayed on the display device, the display loses its unity with surroundings. Therefore, a possibility that an appearance of a mobile object such as a vehicle gives a sense of discomfort to a person outside the vehicle increases.

The present invention has been made in view of the above-described problems, and an object of the present invention is to improve unity with the surroundings in a mobile-object-mounted display device that is mounted on a mobile object and performs display toward an outside of the mobile object.

Solution to Problem

The present invention adopts the following aspects as means for solving the above problems.

A first aspect is a mobile-object-mounted display device that is mounted on a mobile object and performs display toward an outside of the mobile object, the device including: one or a plurality of light emitting elements; and a light emitting element support body that supports the one or the plurality of light emitting elements along a surface having a three-dimensional shape.

A second aspect is the mobile-object-mounted display device according to the first aspect, in which the plurality of the light emitting elements are provided, and the plurality of light emitting elements are arranged along the surface having the three-dimensional shape.

A third aspect is the mobile-object-mounted display device according to the second aspect, in which the light emitting element support body is a circuit board on which the light emitting elements are mounted and which has a curved surface along the surface having the three-dimensional shape.

A fourth aspect is the mobile-object-mounted display device according to the second aspect, in which the light emitting element support body is a support substrate to which a tape material to which the light emitting elements are attached is pasted and which has a curved surface along the surface having the three-dimensional shape.

A fifth aspect is the mobile-object-mounted display device according to the first aspect, in which one organic EL element is provided as the light emitting element.

A sixth aspect is the mobile-object-mounted display device according to any one of the first to fifth aspects, further including an outer cover that is disposed in front of the light emitting elements and has translucency, in which a buffer space is provided between the light emitting elements and the outer cover.

A seventh aspect is the mobile-object-mounted display device according to the sixth aspect, further including an interposing member interposed between the light emitting element support body and the outer cover, in which the interposing member is disposed to avoid at least a part of a display area in which the plurality of light emitting elements are disposed when viewed from an outer cover side.

An eighth aspect is the mobile-object-mounted display device according to the seventh aspect, in which the display area has a rectangular shape having an upper edge portion, a lower edge portion, a left edge portion, and a right edge portion when viewed from the outer cover side, and the interposing member has a bilaterally symmetrical shape that overlaps at least any one of the upper edge portion, the lower edge portion, the left edge portion, and the right edge portion of the display area when viewed from the outer cover side.

A ninth aspect is the mobile-object-mounted display device according to the eighth aspect, in which the interposing member has a frame shape surrounding the display area when viewed from the outer cover side.

A tenth aspect is the mobile-object-mounted display device according to any one of the sixth to ninth aspects, further including a rear member that is coupled to the outer cover from behind and forms a closed space that accommodates the light emitting elements with the outer cover therebetween.

Advantageous Effects of Invention

According to the present invention, one or a plurality of light emitting elements are provided, and these light emitting elements are supported along a surface having a three-dimensional shape by the light emitting element support body. For this reason, a display surface formed by the one or a plurality of light emitting elements is not planar but has a three-dimensional shape. Therefore, according to the present invention, by installing a planar display unit on a surface of a three-dimensional mobile object, it is possible to reduce the sense of discomfort from the appearance felt by a person outside the mobile object. Therefore, according to the present invention, it is possible to improve unity with the surroundings of a mobile-object-mounted display device that is mounted on the mobile object and performs display toward an outside of the mobile object.

DESCRIPTION OF EMBODIMENTS

An embodiment of a mobile-object-mounted display device according to the present invention will be described below with reference to the drawings.

First Embodiment

Figure 1:
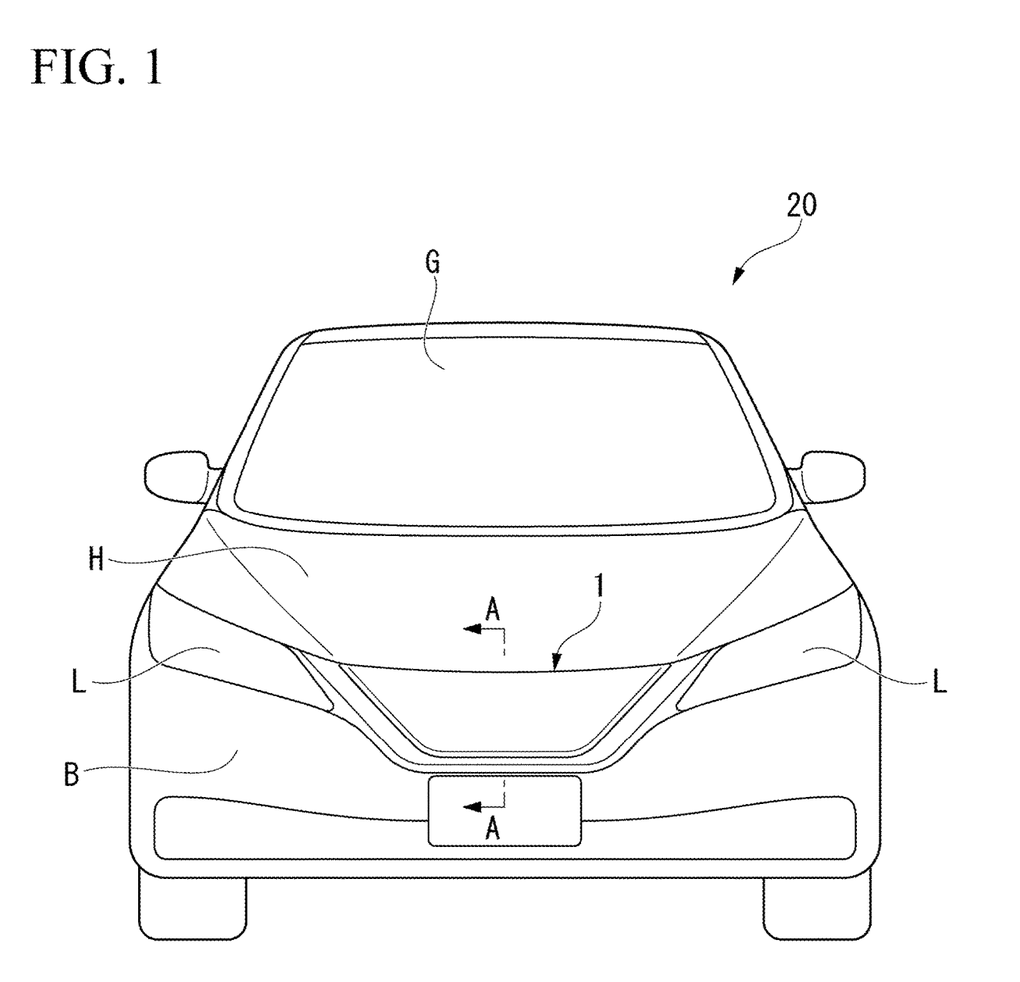
FIG. 1 is a schematic front view of a vehicle provided with a screen grille according to a first embodiment of the present invention.

FIG. 1 is a schematic front view of a vehicle 20 (mobile object) provided with a screen grille 1 (mobile-object-mounted display device) according to the first embodiment of the present invention. As shown in FIG. 1, the vehicle 20 includes an openable and closable hood H disposed below a windshield G, headlamps L that are disposed below the hood H to be separated from each other to the left and right, and a front bumper B disposed below the headlamps L.

Surfaces of vehicle parts such as the hood H, the headlamps L, and the front bumper B have complicated three-dimensional shapes corresponding to a type of the vehicle 20 on which they are mounted. For example, in the present embodiment, an upper surface of the hood H is curved to drop downward as it goes toward the front of the vehicle. The front surfaces of the headlamps L and the front surface of the front bumper B are curved rearward as they go toward ends of the vehicle 20 in a vehicle width direction.

Note that the vehicle parts mounted on the vehicle 20 in the present embodiment are only examples, and other vehicle parts can be mounted on the vehicle 20. Further, the surface shapes of the vehicle parts according to the present embodiment are also examples, and the surface shapes of the vehicle parts can be changed to a three-dimensional shape instead of a flat surface. However, not all vehicle parts need to have a three-dimensional surface shape. At least one surface shape of the plurality of vehicle parts has a three-dimensional shape.

The screen grille 1 of the present embodiment is a display device that performs display of pictograms, characters, or the like toward the outside of the vehicle 20 (outside the mobile object), and as shown in FIG. 1, it is disposed in a front part of the vehicle 20 to be surrounded by the vehicle parts having three-dimensional surfaces as described above. In the present embodiment, the screen grille 1 is disposed below the hood H, above the front bumper B, and between the left and right headlamps L.

Figure 2:
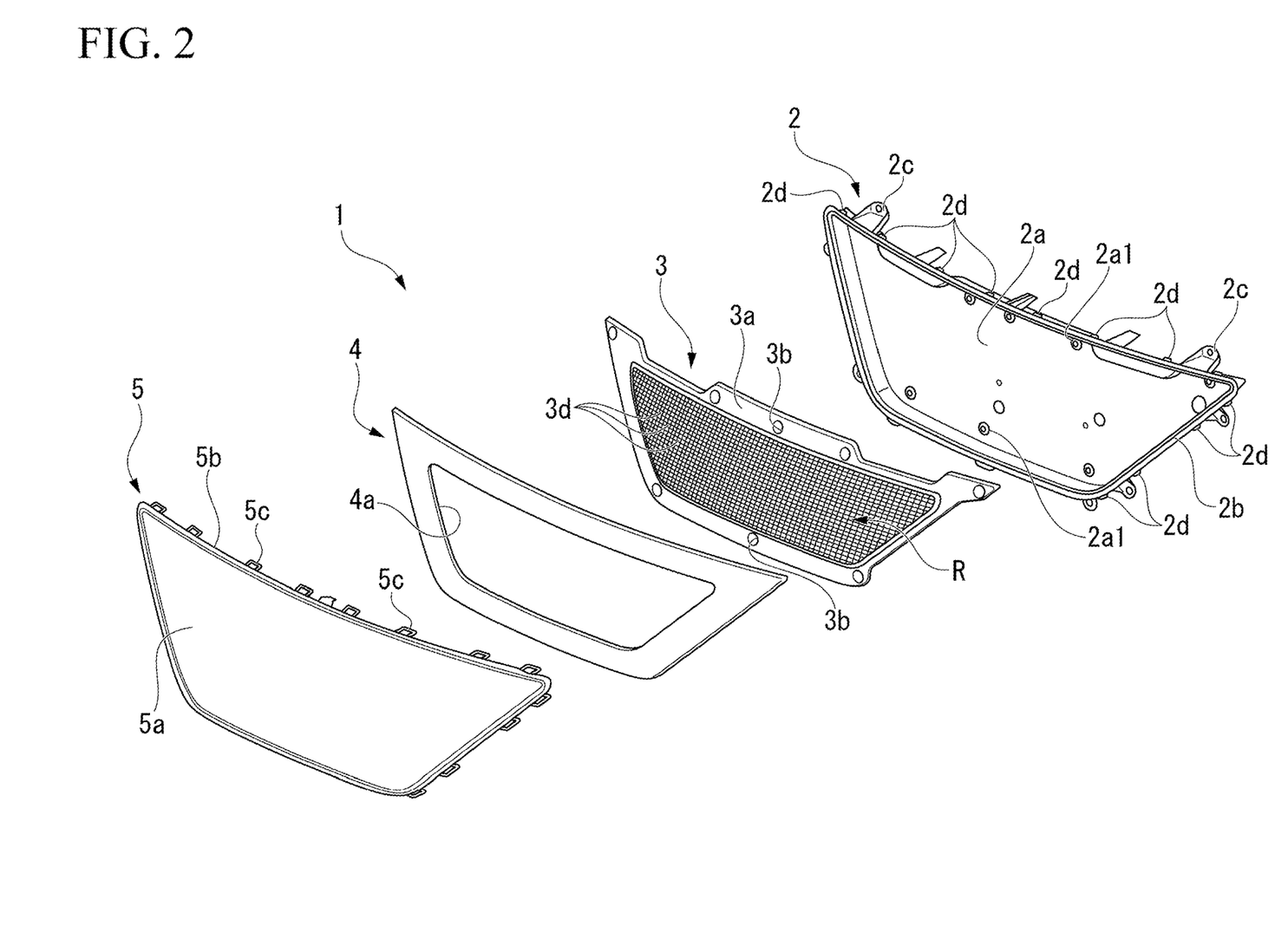
FIG. 2 is an exploded perspective view of the screen grille according to the first embodiment of the present invention.
Figure 3:
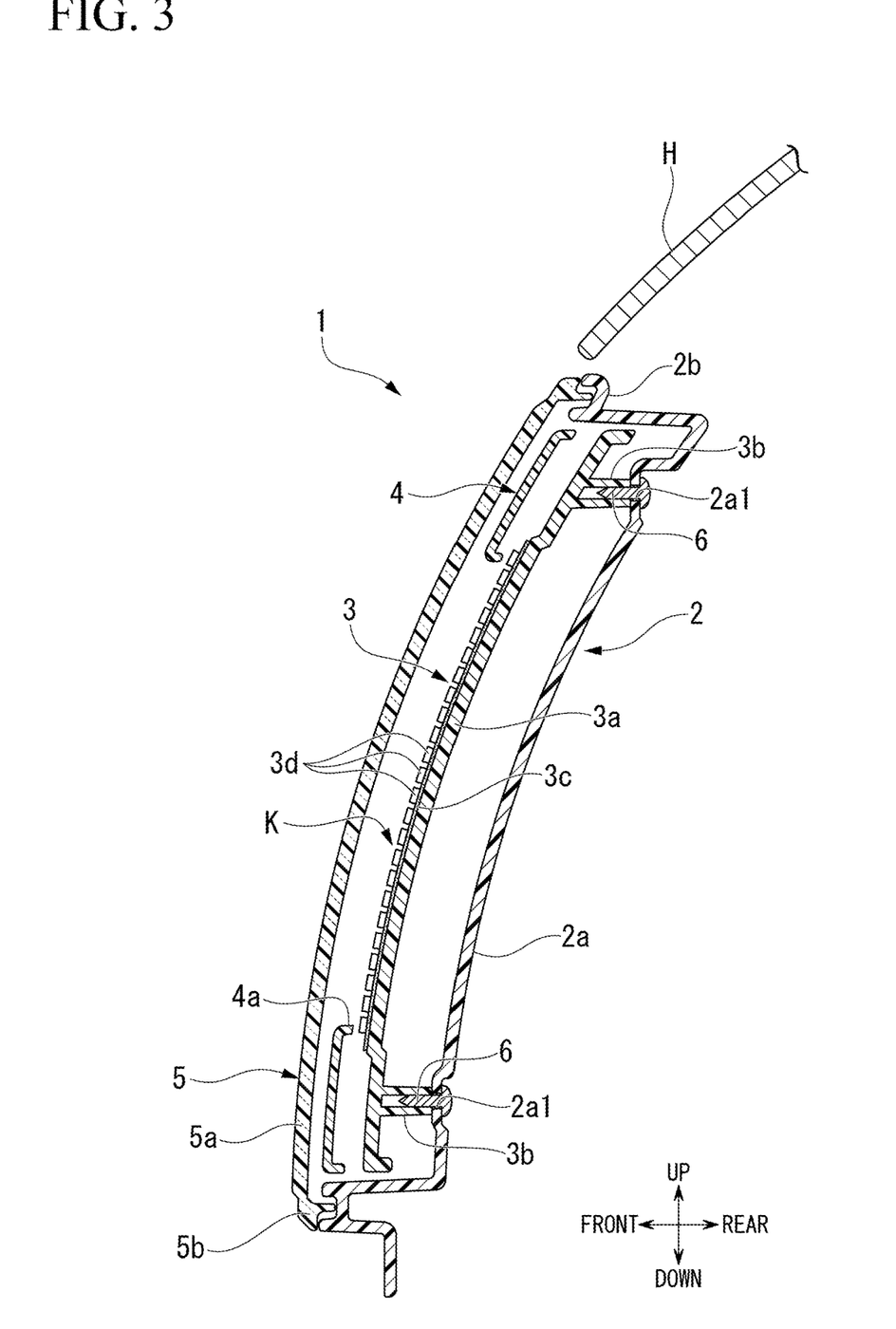
FIG. 3 is a cross-sectional view of the screen grille according to the first embodiment of the present invention along a vertical plane in a vehicle front-rear direction.
Figure 4:
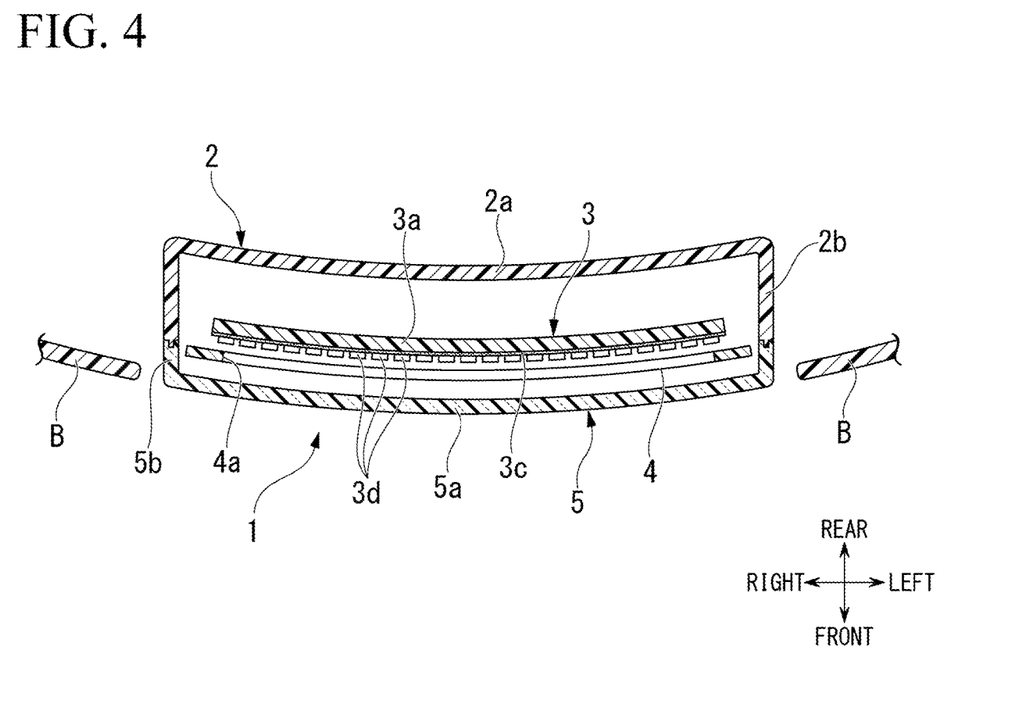
FIG. 4 is a horizontal cross-sectional view of the screen grille according to the first embodiment of the present invention.

FIG. 2 is an exploded perspective view of the screen grille 1 of the present embodiment. FIG. 3 is a cross-sectional view of the screen grille 1 of the present embodiment along a vertical plane in a vehicle front-rear direction, and is a cross-sectional view along line A-A in FIG. 1. FIG. 4 is a horizontal cross-sectional view of the screen grille 1 according to the present embodiment. For example, as shown in FIGS. 2 and 3, the screen grille 1 of the present embodiment includes an inner member 2 (rear member), a display unit 3, a bezel 4, and an outer cover 5.

Note that, in the following description, a side where information is presented by the display unit 3 is called a front side, and a side where the information is not displayed by the display unit 3 is called a rear side. In the present embodiment, the inner member 2, the display unit 3, the bezel 4, and the outer cover 5 are arranged in a front-rear direction. Among these, the inner member 2 is disposed on a rearmost side, and the outer cover 5 is disposed on a foremost side.

The inner member 2 is a member that directly or indirectly supports the display unit 3, the bezel 4, and the outer cover 5, and is disposed behind (to the rear of) the display unit 3, the bezel 4, and the outer cover 5. The inner member 2 is formed of a black ABS, for example. The inner member 2 has a plate-like portion 2a and an inner edge portion 2b provided to surround the plate-like portion 2a in an up-down direction and a left-right direction.

The plate-like portion 2a is a plate-like portion that is disposed with a certain gap in the front-rear direction with respect to a support substrate 3a of the display unit 3, which will be described later, and covers the display unit 3 from behind. As shown in FIG. 3, the plate-like portion 2a is curved in a cross-section in the front-rear direction of the vehicle such that the front surface thereof is closer to a vertical plane as it goes toward a front end. In other words, the front surface of the plate-like portion 2a is curved such that, near an upper end, a normal line to the front surface faces obliquely upward, and near a lower end, the normal line to the front surface is closer to the parallel than the normal line near the upper end.

Further, as shown in FIG. 4, the plate-like portion 2a is curved in a horizontal cross-section such that the front surface thereof faces in the left-right direction as it goes toward the ends from a center of the vehicle 20. In other words, the front surface of the plate-like portion 2a is curved such that, near the left and right ends, the normal line to the front surface faces obliquely to the sides, and such that, near the center, the normal line to the front surface is closer to parallel to the front-rear direction than the normal line near the left and right ends.

Thus, in the present embodiment, the plate-like portion 2a of the inner member 2 has a three-dimensional shape curved in the vertical and horizontal cross-sections. The plate-like portion 2a of the inner member 2 of which the front surface has a three-dimensional shape in this way is disposed with a certain gap with respect to the support substrate 3a (described later) of the display unit 3 which has a three-dimensional shape as well. Note that the surface of the plate-like portion 2a of the inner member 2 does not necessarily have a three-dimensional shape, and may be flat.

Further, the plate-like portion 2a is provided with a plurality of holes 2a1 for fixing the display unit 3 with screws 6 (see FIG. 3). The display unit 3 is fixed to the inner member 2 by screwing the screws 6 inserted into the holes 2a1 into threaded portions 3b provided on the support substrate 3a of the display unit 3, which will be described later. Further, the inner edge portion 2b of the inner member 2 is provided with a plurality of attachment portions 2c for attaching the inner member 2 to the vehicle body. The screen grille 1 of the present embodiment is fixed to the vehicle body by fixing these attachment portions 2c to the vehicle body with screws or the like (not shown).

The inner edge portion 2b of the inner member 2 is provided with locking projections 2d for locking the outer cover 5. The outer cover 5 is coupled to the inner member 2 by the locking projections 2d. Such an inner member 2 is coupled to the outer cover 5 from behind and forms a closed space that accommodates LED elements 3d with the outer cover 5 therebetween.

The display unit 3 is a device that displays characters and pictograms based on the control of a control device (not shown), and includes the support substrate 3a (light emitting element support body), the threaded portions 3b, a pasting sheet 3c (tape material), and the LED elements 3d (light emitting elements). "LED" means "light emitting diode."

The support substrate 3a is a plate-like portion to which the pasting sheet 3c is pasted on the front surface, and supports the LED elements 3d via the pasting sheet 3c. As shown in FIG. 3, the support substrate 3a is curved in a cross-section in the front-rear direction of the vehicle such that the front surface thereof is closer to the vertical plane as it goes toward the front end. In other words, the front surface of the support substrate 3a is curved such that, near an upper end, a normal line to the front surface faces obliquely upward, and near a lower end, the normal line to the front surface is closer to parallel than the normal line near the upper end.

Further, as shown in FIG. 4, the support substrate 3a is curved in a horizontal cross-section such that the front surface thereof faces in the left-right direction as it goes toward the ends from the center of the vehicle 20. In other words, the front surface of the support substrate 3a is curved such that, near the left and right ends, the normal line to the front surface faces obliquely to the sides, and such that, near the center, the normal line to the front surface is closer to parallel to the front-rear direction than the normal line near the left and right ends.

Thus, in the present embodiment, the support substrate 3a has a three-dimensional shape curved in the vertical and horizontal cross-sections. The support substrate 3a of which the front surface has a three-dimensional shape in this way is disposed with a certain gap from the outer cover 5 which has a three-dimensional shape as well. Such a support substrate 3a supports a plurality of LED elements 3d such that the plurality of LED elements 3d are along the front surface of the support substrate 3a. That is, the LED elements 3d are arranged and supported by the support substrate 3a along the surface having the three-dimensional shape. That is, the support substrate 3a supports the plurality of LED elements 3d such that the plurality of LED elements 3d are disposed (arranged) along the front surface of the support substrate 3a. That is, the support substrate 3a supports the plurality of LED elements 3d such that the plurality of LED elements 3d are disposed (arranged) along the surface having the three-dimensional shape.

The threaded portions 3b are cylindrical portions provided to protrude rearward from a back surface of the support substrate 3a and a plurality of threaded portions 3b are provided to correspond to the plurality of holes 2a1 provided in the plate-like portion 2a of the inner member 2. That is, the number of threaded portions 3b and the number of holes 2a1 are the same. The screws 6 are screwed into these threaded portions 3b, as shown in FIG. 3.

The pasting sheet 3c is a sheet material having the LED elements 3d fixed on the surface side and an adhesive surface on the back surface side. The pasting sheet 3c is pasted on the front surface of the support substrate 3a, and fixes the LED elements 3d with respect to the support substrate 3a.

The LED elements 3d are fixed to the front surface of the support substrate 3a via the pasting sheet 3c, and the plurality of LED elements 3d are arranged in the front-rear direction and the left-right direction. These LED elements 3d are collectively disposed in a display area R (see FIG. 2) provided in the central portion of the support substrate 3a when viewed from the front. Each of the LED elements 3d is coupled to a lead wire (that is not shown) for supplying power to the LED elements 3d. These lead wires are extended laterally from the display area R, drawn out via openings provided in the support substrate 3a or the plate-like portion 2a of the inner member 2, for example, and coupled to the control device. Note that it is preferable to seal the openings for passing the lead wires. Desired characters or pictograms are displayed in the display area R by selectively causing these LED elements 3d to emit light.

In addition, as shown in FIG. 2, an area in which the LED elements 3d are not disposed is provided annularly around the display area R in the support substrate 3a, and the threaded portions 3b are provided on the back surface of the area where the LED elements 3d are not provided.

Here, the LED elements 3d are arranged along the front surface of the three-dimensional support substrate 3a. That is, the plurality of LED elements 3d are arranged along the surface having the three-dimensional shape. In the present embodiment, the LED elements 3d are arranged such that the LED elements 3d are along a curved surface that continues from the upper surface of the hood H in a cross-section in the front-rear direction of the vehicle. Further, in the present embodiment, the LED elements 3d are arranged such that the LED elements 3d are along the curved surface that continues from the front surface of the front bumper B in the horizontal cross-section. Thus, in the present embodiment, the plurality of LED elements 3d are arranged such that the LED elements 3d are along the three-dimensional curved surface that continues from the surfaces of the surrounding vehicle parts. As a result, the display surface has a three-dimensional shape instead of a planar shape.

Further, a buffer space K is provided between the LED elements 3d and the outer cover 5. The buffer space K is a space that prevents the LED elements 3d from coming into contact with the outer cover 5 even when the LED elements 3d and the outer cover 5 move relative to each other due to running vibrations of the vehicle 20. Further, by providing the buffer space K, it is possible to make it difficult to visually recognize the LED elements 3d from the front of the outer cover 5 when the LED elements 3d are turned off.

As shown in FIG. 2, the bezel 4 is an annular plate member having an opening 4a in the center, and has a frame shape surrounding the display area R when viewed from the outer cover 5 side. The bezel 4 is an interposing member interposed between the display unit 3 and the outer cover 5, and is formed of a black ABS, for example. The opening 4a of the bezel 4 has a shape slightly smaller than the display area R when viewed from the front side of the outer cover 5, such that the emitting LED elements 3d can be visually recognized from an outer side of the outer cover 5.

The bezel 4 is disposed slightly ahead of the LED elements 3d, and is disposed with a slight gap from the LED elements 3d. As shown in FIG. 3, the bezel 4 is disposed such that an inner edge portion slightly overlaps the LED element 3d arranged at the end of the display area R when viewed from the front. Since the inner edge portion forming the opening 4a of the bezel 4 slightly overlaps the LED element 3d at the end when viewed from the front, even when a gap is provided between the bezel 4 and the LED element 3d, it is possible to prevent the outer side of the display area R from being visually recognized from the outside. That is, it is possible to prevent the outer edge portion of the display area R from being visually recognized via the opening 4a of the bezel 4 when the opening 4a of the bezel 4 is viewed from the front side of the outer cover 5.

Further, such a bezel 4 functions as a stopper that restricts the display unit 3 from approaching the outer cover 5 due to running of the vehicle 20 or the like. Therefore, even when the vehicle 20 is stopped in an emergency, the bezel 4 can be prevented from approaching the outer cover 5 of the display unit 3, the LED element 3d can be prevented from coming into contact with the outer cover 5, and the distance between the LED elements 3d and the outer cover 5 can be prevented from changing.

The outer cover 5 is a transparent cover member disposed in front of the display unit 3 (that is, the LED elements 3d). The outer cover 5 is formed of, for example, PMMA or the like. Such an outer cover 5 has a transparent plate-like portion 5a and an outer edge portion 5b provided to surround the transparent plate-like portion 5a in the up-down direction and the left-right direction.

The transparent plate-like portion 5a is a plate-like portion that is disposed in front of the LED elements 3d and covers the display unit 3 from the front. As shown in FIG. 3, the transparent plate-like portion 5a is curved in a cross-section in the vehicle front-rear direction such that the rear surface thereof is closer to the vertical plane as it goes toward the front end. In other words, the inner surface of the transparent plate-like portion 5a is curved such that, near an upper end, a normal line to the rear surface faces obliquely downward, and near the lower end, the normal line to the rear surface is closer to parallel than the normal line near the upper end. Further, the front surface of the transparent plate-like portion 5a is curved such that, near an upper end, a normal line to the front surface faces obliquely upward, and near a lower end, the normal line to the front surface is closer to parallel than the normal line near the upper end.

Further, as shown in FIG. 4, the transparent plate-like portion 5a is curved in a horizontal cross-section such that the rear surface thereof faces in the left-right direction as it goes toward the ends from the center of the vehicle 20. That is, the rear surface of the transparent plate-like portion 5a is curved such that, near the left and right ends, the normal lines to the rear surface and the front surface are inclined with respect to the front-rear direction, and near the center, the normal lines to the rear surface and the front surface are closer to parallel to the front-rear direction than the normal line near the left and right ends.

In the present embodiment, the front and rear surfaces of the transparent plate-like portion 5a are three-dimensional surfaces curved with the same curvature such that the distance between the front and rear surfaces is always constant. Thus, in the present embodiment, the transparent plate-like portion 5a of the outer cover 5 has a three-dimensional shape curved in the vertical and horizontal cross-sections.

The transparent plate-like portion 5a of the outer cover 5 having the three-dimensional front surface is disposed with a certain gap with respect to the LED elements 3d (that is, display area R) of the display unit 3, which is similarly formed into a three-dimensional shape.

The outer edge portion 5b of the outer cover 5 is provided with locking claws 5c for locking the outer cover 5 to the inner member 2. The outer cover 5 is coupled to the inner member 2 by locking the locking claws 5c with the locking projections 2d of the inner member 2. Note that a boundary portion between the outer edge portion 5b and the inner edge portion 2b is sealed as necessary. Such sealing seals the closed space between the inner member 2 and the outer cover 5, making it possible to protect the LED elements 3d from moisture or the like in the air.

In the screen grille 1 of the present embodiment, characters or pictograms are displayed in the display area R by selectively causing the LED elements 3d to emit light. At this time, in the screen grille 1 of the present embodiment, since the LED elements 3d are arranged and supported along the three-dimensional surface along the upper surface of the hood H and the front surface of the front bumper B, the characters or pictograms displayed in the display area R are similarly displayed along the three-dimensional surface. Therefore, it is possible to prevent the displayed characters or pictograms from becoming flat, and to enhance the unity of the characters or pictograms with the surfaces of surrounding three-dimensional vehicle parts.

The screen grille 1 of the present embodiment as described above is mounted on the vehicle 20 and performs display toward the outside of the vehicle 20. The screen grille 1 of the present embodiment includes a plurality of LED elements 3d and a support substrate 3a for arranging and supporting the plurality of LED elements 3d along the surface having the three-dimensional shape.

According to the screen grille 1 of the present embodiment, a plurality of LED elements 3d are provided, and these LED elements 3d are arranged and supported by the support substrate 3a along the surface having the three-dimensional shape. Therefore, the display surface formed by the plurality of LED elements 3d has a three-dimensional shape instead of a planar shape. Therefore, according to the screen grille 1 of the present embodiment, by installing the planar display unit 3 on the surface of the vehicle having a three-dimensional shape, it is possible to reduce the sense of discomfort from the appearance felt by a person outside the vehicle. Therefore, according to the screen grille 1 of the present embodiment, in the screen grille 1 that is mounted on the vehicle and performs display toward the outside of the vehicle, it is possible to improve unity with surrounding parts.

In the screen grille 1 of the present embodiment, the support substrate 3a has a curved surface along the surface having the three-dimensional shape and to which the pasting sheet 3c having the LED elements 3d attached is pasted. Therefore, by attaching the LED elements 3d to the surface of the support substrate 3a, it becomes possible to easily arrange and support the LED elements 3d along the surface having the three-dimensional shape.

Further, the screen grille 1 of the present embodiment is provided with the outer cover 5 that is disposed in front of the LED elements 3d and has translucency, and a buffer space K is provided between the LED elements 3d and the outer cover 5. Therefore, even when the LED elements 3d and the outer cover 5 move relative to each other due to running vibrations of the vehicle 20 or the like, the LED elements 3d can be prevented from coming into contact with the outer cover 5. Further, by providing the buffer space K, it is possible to make it difficult to visually recognize the LED elements 3d from the front of the outer cover 5 when the LED elements 3d are turned off.

Further, the screen grille 1 of the present embodiment includes a bezel 4 interposed between the support substrate 3a and the outer cover 5, and the bezel 4 is disposed to avoid at least a part of the display area R where the plurality of LED elements 3d are disposed when viewed from the outer cover 5 side. Such a bezel 4 functions as a stopper that restricts the display unit 3 from approaching the outer cover 5 due to running of the vehicle 20 or the like. Therefore, even when the vehicle 20 is stopped in an emergency, the bezel 4 can be prevented from approaching the outer cover of the display unit 3, the LED element 3d can be prevented from coming into contact with the outer cover 5, and the distance between the LED elements 3d and the outer cover 5 can be prevented from changing.

Further, in the screen grille 1 of the present embodiment, the bezel 4 has a frame shape surrounding the display area R when viewed from the outer cover 5 side. Therefore, the bezel 4 can hide the up-down direction and the left-right direction of the area where the LED elements 3d are disposed, and the lead wires and the like coupled to the LED elements 3d can be hidden. That is, the bezel 4 can hide the outer edge portions of the area where the LED elements 3d are disposed extending in the up-down direction and left-right direction, and the lead wires and the like coupled to the LED elements 3d can be hidden. Therefore, the screen grille 1 of the present embodiment can improve the external impression of the screen grille 1 by including the bezel 4.

Further, the screen grille 1 of the present embodiment includes an inner member 2 that is coupled to the outer cover 5 from behind and forms a closed space that accommodates the LED elements 3d with the outer cover 5 therebetween. Therefore, it is possible to prevent external moisture or the like from entering the space between the inner member 2 and the outer cover 5, thereby protecting the LED elements 3d from moisture or the like.

Second Embodiment

Next, a second embodiment of the present invention will be described. Note that, in the description of the present embodiment, the description of the same parts as those of the first embodiment will be omitted or simplified.

Figure 5:
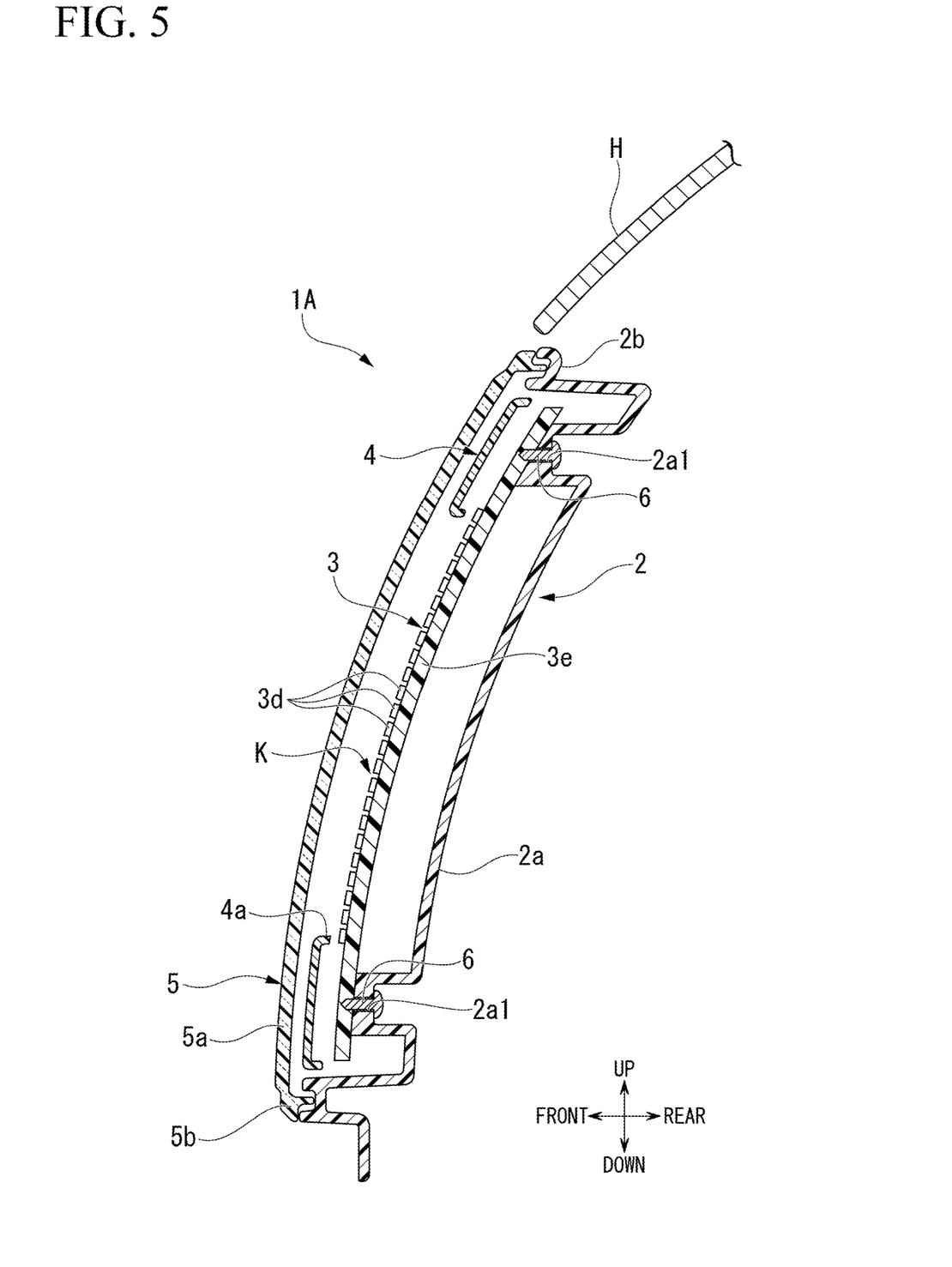
FIG. 5 is a cross-sectional view of a screen grille according to a second embodiment of the present invention along a vertical plane in the vehicle front-rear direction.

FIG. 5 is a cross-sectional view of a screen grille 1A of the present embodiment along a vertical plane in the front-rear direction of the vehicle. As shown in this figure, in the screen grille 1A of the present embodiment, the display unit 3 does not include the support substrate 3a or the pasting sheet 3c, but includes a circuit board 3e (light emitting element support body).

The circuit board 3e is a wiring board on which the LED elements 3d are mounted on the front side, and supports the mounted LED elements 3d. As shown in FIG. 5, the circuit board 3e is curved in a cross-section in the front-rear direction of the vehicle such that the front surface thereof is closer to the vertical plane as it goes toward the rear end. In other words, the front surface of the circuit board 3e is curved such that, near an upper end, a normal line to the front surface faces obliquely upward, and near a lower end, the normal line to the front surface is closer to parallel than the normal line near the upper end.

Figure 6:
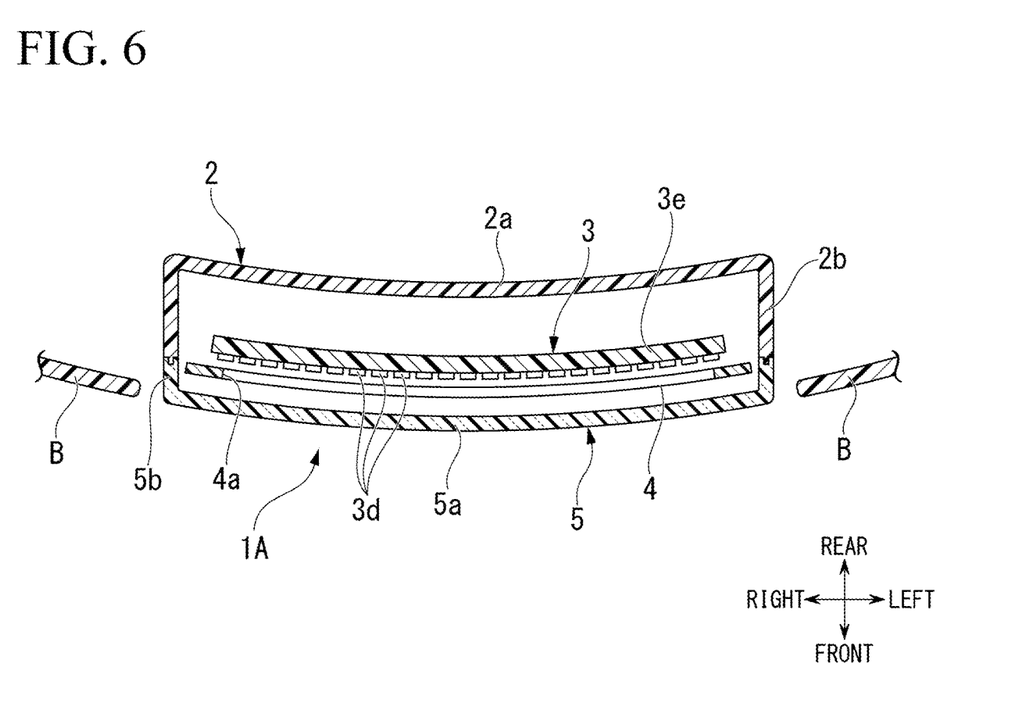
FIG. 6 is a horizontal cross-sectional view of the screen grille according to the second embodiment of the present invention.

FIG. 6 is a horizontal cross-sectional view of the screen grille 1A of the present embodiment. As shown in this figure, the circuit board 3e is curved in a horizontal cross-section such that the front surface thereof faces in the left-right direction as it goes toward the ends from the center of the vehicle 20. In other words, the front surface of the circuit board 3e is curved such that, near the left and right ends, the normal line to the front surface faces obliquely to the sides, and near the center, the normal line to the front surface is closer to parallel to the front-rear direction than the normal line near the left and right ends.

Thus, in the present embodiment, the circuit board 3e has a three-dimensional shape curved in the vertical and horizontal cross-sections. The circuit board 3e of which the front surface has a three-dimensional shape in this way is disposed with a certain gap from the outer cover 5 which has a three-dimensional shape as well. Such a circuit board 3e supports a plurality of LED elements 3d such that the LED elements 3d are along the front surface of the circuit board 3e. That is, the LED elements 3d are arranged and supported by the support substrate 3a along the surface having the three-dimensional shape.

In the screen grille 1A of the present embodiment as described above, the circuit board 3e has a three-dimensional front surface on which the LED elements 3d are mounted. Therefore, by mounting the LED elements 3d on the surface of the circuit board 3e, it becomes possible to easily arrange and support the LED elements 3d along the surface having the three-dimensional shape.

Moreover, by mounting the LED elements 3d on the circuit board 3e, the LED elements 3d can be energized through the circuit board 3e, and the lead wires coupled to each of the LED elements 3d do not have to be drawn out to the outside of the screen grille 1A. That is, except for the lead wires for energizing the main body of the circuit board 3e and signal wires for sending signals, there are no wires drawn out of the screen grille 1A, and the wires drawn out of the screen grille 1A can be greatly reduced. Moreover, by mounting a control chip on the circuit board 3e, it becomes possible to perform lighting control of each of the LED elements 3d by the control chip mounted on the circuit board 3e.

Although the preferred embodiments of the present invention have been described above with reference to the accompanying drawings, it goes without saying that the present invention is not limited to the above embodiments. The various shapes, combinations, and the like of each of the constituent members shown in the above-described embodiment are merely examples, and can be variously changed based on design requirements and the like without departing from the gist of the present invention.

For example, in the above-described embodiment, the configuration including the LED elements 3d as the light emitting elements has been described. However, the present invention is not limited to this. For example, as the light emitting elements, it is possible to use a single surface emitting organic EL (electroluminescence) element or the like having a three-dimensional shape. In this case, the light emitting elements can be configured with a simple configuration.

Moreover, in the above embodiment, the configuration in which the LED elements 3d are arranged and supported along the curved surface has been described. However, the present invention is not limited to this. For example, it is possible to adopt a configuration in which the light emitting elements are arranged and supported along a three-dimensional surface provided with a stepped portion and a curved portion.

Further, in the above-described embodiment, the configuration in which the bezel 4 is an annular plate member has been described. However, the present invention is not limited to this. When viewed from the front of the vehicle, the bezel 4 may be bilaterally symmetrical to overlap at least one of the upper edge portion, lower edge portion, left edge portion, and right edge portion of the display area R. For example, the shape of the bezel 4 may be a shape that overlaps only the upper edge portion, a shape that overlaps only the lower edge portion, a shape that overlaps only the left and right sides, and a shape that overlaps either the upper edge portion or the lower edge portion and both the left and right sides. In such a case, the bezel 4 functions as a stopper that restricts the display unit 3 from approaching the outer cover 5. Moreover, the bezel 4 can prevent the outer side of the display area R from being visually recognized from the outside. Note that, although the bezel 4 functions as the stopper when the bezel 4 overlaps at least one of the upper edge portion, the lower edge portion, the left edge portion, and the right edge portion of the display area R, it is preferable that the bezel 4 be bilaterally symmetrical when viewed from the front of the vehicle in terms of aesthetics of the vehicle.

Further, in the above-described embodiment, the configuration in which the mobile-object-mounted display device of the present invention is mounted as the screen grille 1A on the front portion of the vehicle 20 has been described. However, the present invention is not limited to this. For example, it is possible to install the mobile-object-mounted display device on the side, rear, or upper portion of the vehicle 20.

Further, in the above-described embodiment, a configuration has been described in which the mobile object on which the mobile-object-mounted device of the present invention is mounted is the vehicle 20. However, the present invention is not limited to this. For example, it is possible to mount the mobile-object-mounted device of the present invention on an aerial mobile object such as a drone or an airship.

Moreover, in the above-described embodiment, the configuration including the outer cover 5 has been described. However, the present invention is not limited to this. For example, when the light emitting element has weather resistance, it is possible to adopt a configuration without the outer cover 5.

INDUSTRIAL APPLICABILITY

According to the present invention, one or a plurality of light emitting elements are provided, and these light emitting elements are supported along a surface having a three-dimensional shape by the light emitting element support body. For this reason, a display surface formed by the one or plurality of light emitting elements is not planar but has a three-dimensional shape. Therefore, according to the present invention, by installing a planar display unit on the surface of a three-dimensional mobile object, it is possible to reduce the sense of discomfort from the appearance felt by a person outside the mobile object. Therefore, according to the present invention, it is possible to improve unity with the surroundings of a mobile-object-mounted display device that is mounted on a mobile object and performs display toward the outside of the mobile object.

REFERENCE SIGNS LIST

1: Screen grille (Mobile-object-mounted display device)
1A: Screen grille (Mobile-object-mounted display device)
2: Inner member (Rear member)
2a: Plate-like portion
3: Display unit
3a: Support substrate (Light emitting element support body)
3b: Threaded portion
3c: Pasting sheet
3d: LED element (Light emitting element)
3e: Circuit board (Light emitting element support body)
4: Bezel (Interposing member)
5: Outer cover
20: Vehicle (Mobile object)
B: Front bumper
H: Hood
K: Buffer space
R: Display area

The invention claimed is:

1. A screen grille that is mounted on a vehicle and performs display toward an outside of the vehicle, the screen grille comprising:
   a plurality of light emitting elements;
   a plate-shaped light emitting element support body that has a front surface, the front surface being a curved surface formed along a surface of the vehicle, the surface having a three-dimensional shape, and that supports the plurality of light emitting elements along the front surface;
   an outer cover that is disposed in front of the plurality of light emitting elements and has translucency; and
   an interposing member interposed between the light emitting element support body and the outer cover,
   wherein the light emitting element support body is curved in a vertical cross-section in a front-rear direction such that the front surface is closer to a vertical plane as it goes toward a front end of the light emitting element support body, and is curved in a horizontal cross-section such that the front surface faces in a left-right direction as it goes toward ends of the light emitting element support body in the left-right direction from a center of the light emitting element support body in the left-right direction,
   the plurality of light emitting elements are collectively disposed in a display area provided in a central portion of the light emitting element support body when viewed from an outer cover side,
   the interposing member is an annular plate member having an opening in a center thereof, has a frame shape surrounding the display area when viewed from the outer cover side, and is disposed ahead of the plurality of light emitting elements,
   an inner edge portion forming the opening, of the interposing member is disposed to overlap light emitting elements arranged at an outer edge portion of the display area, of the plurality of light emitting elements when viewed from the outer cover side.

2. The screen grille according to claim 1, wherein the plurality of light emitting elements are arranged along the front surface.

3. The screen grille according to claim 2, wherein the light emitting elements are mounted on the front surface of the light emitting element support body that is a circuit board.

4. The screen grille according to claim 2, wherein a tape material to which the light emitting elements are attached is pasted on the front surface of the light emitting element support body that is a support substrate.

5. The screen grille according to claim 2, wherein the plurality of light emitting elements are arranged in two directions along the surface having the three-dimensional shape, the two directions being perpendicular to each other.

6. The screen grille according to claim 1, wherein a buffer space is provided between the light emitting elements and the outer cover.

7. The screen grille according to claim 6 further comprising:
   a rear member that is coupled to the outer cover from behind and forms a closed space that accommodates the light emitting elements with the outer cover therebetween.

8. The screen grille according to claim 1,
   wherein the display area has a rectangular shape having an upper edge portion, a lower edge portion, a left edge portion, and a right edge portion when viewed from the outer cover side as the outer edge portion, and the interposing member has a bilaterally symmetrical shape that overlaps the light emitting elements arranged at the upper edge portion, the lower edge portion, the left edge portion, and the right edge portion of the display area when viewed from the outer cover side.

9. The screen grille according to claim 1, wherein the screen grille is configured to perform at least one of display of a pictogram and display of a character.

10. A screen grille that is mounted on a vehicle and performs display toward an outside of the vehicle, the screen grille comprising:
one light emitting element;
a plate-shaped light emitting element support body that has a front surface, the front surface being a curved surface formed along a surface of the vehicle, the surface having a three-dimensional shape, and that supports the one light emitting element along the front surface;
an outer cover that is disposed in front of the one emitting element and has translucency; and
an interposing member interposed between the light emitting element support body and the outer cover,
wherein the light emitting element support body is curved in a vertical cross-section in a front-rear direction such that the front surface is closer to a vertical plane as it goes toward a front end of the light emitting element support body, and is curved in a horizontal cross-section such that the front surface faces in a left-right direction as it goes toward ends of the light emitting element support body in the left-right direction from a center of the light emitting element support body in the left-right direction, the one light emitting element is disposed in a display area provided in a central portion of the light emitting element support body when viewed from an outer cover side, the interposing member is an annular plate member having an opening in a center thereof, has a frame shape surrounding the display area when viewed from the outer cover side, and is disposed ahead of the one light emitting element, an inner edge portion forming the opening, of the interposing member is disposed to overlap a portion arranged at an outer edge portion of the display area, of the one light emitting element when viewed from the outer cover side.

11. The screen grille according to claim 10, wherein one organic EL element is provided as the one light emitting element.

* * * * *